P. PAULSON & J. M. RICHTER.
MITERING DIE.
APPLICATION FILED NOV. 10, 1916.

1,230,319.

Patented June 19, 1917.

Witnesses
Chas. W. Stauffiger
Anna M. Dorr

Inventor
Peter Paulson,
Julius M. Richter,
By
Attorneys

UNITED STATES PATENT OFFICE.

PETER PAULSON AND JULIUS M. RICHTER, OF DETROIT, MICHIGAN.

MITERING-DIE.

1,230,319.  Specification of Letters Patent.  Patented June 19, 1917.

Application filed November 10, 1916. Serial No. 130,535.

*To all whom it may concern:*

Be it known that we, PETER PAULSON and JULIUS M. RICHTER, citizens of the United States of America, residing at Detroit, in the county of Wayne and State of Michigan, have invented certain new and useful Improvements in Mitering-Dies, of which the following is a specification, reference being had therein to the accompanying drawings.

This invention relates to a tube mitering device, and the primary object of our invention is to provide positive and reliable means, in a manner as hereinafter set forth for firmly upholding a tube or hollow member and cutting or shearing the end thereof, without splitting or otherwise disfiguring the tube or member at the cut end thereof.

Another object of our invention is to provide a mitering device that may be advantageously used in a press or similar machine for accurately mitering tubes such as used in the production of windshield frames.

A further object of our invention is to provide a mitering device including dies for holding a tube or hollow member and a reciprocable cutter head for mitering or shearing a tube held by the dies. These and appurtenant parts are constructed with a view of reducing the cost of manufacture, and at the same time retain the features by which safety, durability, and economy are secured, and with such ends in view, our invention resides in the novel construction, combination and arrangement of parts to be hereinafter specifically described and then claimed.

Reference will now be had to the drawing, wherein—

Figure 1:
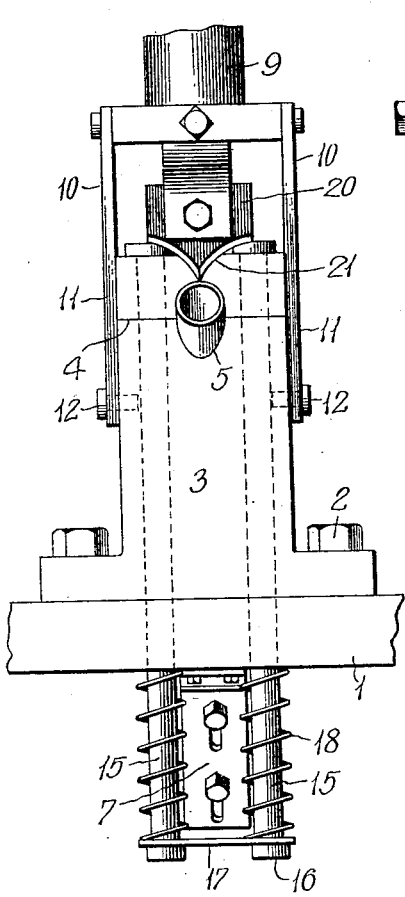
Figure 1 is a front elevation of a tube mitering device.
Figure 2:
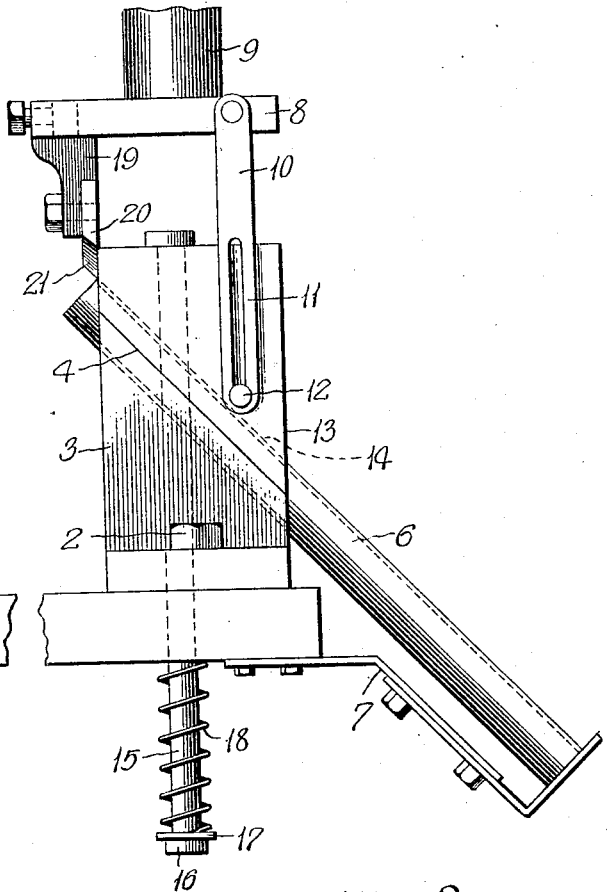
Fig. 2 is a side elevation of the same.

In the drawing, 1 denotes a portion of a table or machine bed and mounted thereon by screw bolts 2 or other fastening means is a stationary die 3. This die has an inclined upper face 4 provided with a longitudinal central groove or seat 5 in which a tube or hollow member 6 may be placed. To correctly position a predetermined length of tube, the table or machine bed 1 has an adjustable stop 7 disposed at an angle for the lower end of the tube 6 to correctly position the upper end thereof relative to the stationary die.

Above the stationary die is a reciprocable cutter head 8 having a shank or stem 9 by which the cutter head is connected to the reciprocable head or plunger of a press or similar machine, (not shown). The sides of the cutter head 8 are provided with depending links 10 having the lower ends thereof slotted, as at 11, to receive studs 12, carried by the sides of a movable die 13. This movable die has a lower inclined face provided with a longitudinal groove 14 adapted to receive the upper portion of the tube 6, so that the movable die 13 may coöperate with the stationary die 3 in clamping the tube 6 in position to be mitered or sheared.

To hold the movable die 13 normally upon the stationary die 3, the movable die 13 has a set of depending rods 15 extending through the stationary die 3, at the sides of the groove or seat 5, and also through the table or machine bed 1. The lower ends of the rods 15 are provided with heads 16 supporting a cross bar 17 and encircling the rods 15 between the cross bar 17 and the table or machine bed 1 are coiled compression springs 18. The expansive force of the springs 18 will firmly hold the movable die 13 on the stationary die 3, but with the rods 15 slidable in the stationary die 3, the movable die 13 may be raised by the cutter head 8, through the medium of the slotted links 10, these links allowing the cutter head 8 to move a predetermined distance in advance of the movable die 13. As the cutter head 8 is raised or recedes it eventually picks up the movable die 13 and raises said die so that a tube may be removed or placed relative to the die.

Suitably connected to the front side of the cutter head 8 is a detachable holder 19 for a detachable cutter blade 20. The holder 19 and blade 20 are disposed so that the blade 20 will be reciprocated against the front faces of the dies 13 and 3, and by reference to Fig. 1, it will be noted that the blade 20 has a beveled and pointed cutting edge 21.

When operating the device, it is essential that the tube or hollow member to be mitered or sheared must be positioned and held between the dies with the upper end thereof protruding from the dies but with an end wall of the tube or member flush with the front faces of the dies. This is necessary in order that the pointed end of the blade 20 will first impinge upon the end edge of the tube or member at the front walls of the dies, thus preventing the tube or member from having its walls crushed or split as the blade 20 passes therethrough. After the pointed end of the blade enters the tube or member, the beveled edges of the blade simultaneously cut and miter walls of the tube, that is, one beveled edge of the blade will cut one semi-cylindrical tube wall, and the other beveled edge of the blade will cut the other semi-cylindrical tube wall.

Figure 3:
Fig. 3 is a cross sectional view of a windshield frame tube such as may be cut or sheared by our device.

The tube section shown in Fig. 3 is somewhat oval and has a longitudinal inset or grooved portion 22 adapted to receive a transparent plate, said plate and tube being used in the production of an automobile windshield. A tube or hollow member of this cross section or any other shape can be mitered between dies by providing the angular confronting faces thereof with suitably shaped grooves to receive the tube, but in all instances, it is essential that the tube be disposed and held at an angle relative to the cutting blade and with the end edge of the tube flush with the walls of the dies, otherwise there is a liability of a tube being crushed or disfigured.

While in the drawing there is illustrated a preferred embodiment of our invention, it is to be understood that the structural elements are susceptible to such variations and modifications as fall within the scope of the appended claims.

What we claim is:—

1. A device for mitering short lengths of tubes comprising a stationary die, a movable die thereon, said dies having angularly disposed grooves confronting faces for holding a tube, rods carried by said movable die and extending through said stationary die adapted for holding said movable die normally on said stationary die, a cutter head above said movable die reciprocable to and from said movable die, a cutter blade carried thereby movable against front vertical faces of said dies, and means connecting said cutter head and said movable die at the sides thereof so that said movable die may be moved relative to said stationary die.

2. In a device for mitering short lengths of tubes, a table, a stationary die thereon, a movable die on said stationary die, said dies having confronting angularly disposed and grooved faces adapted for holding a tube, an angularly disposed adjustable stop carried by said table adapted for holding one end of the tube with the other end of the tube between the dies and with an end edge of the tube flush with the front vertical faces of said dies, rods carried by said movable die extending through said stationary die below said table, means on said rods holding said movable die normally on said stationary die, a cutter head, a cutter blade carried thereby and movable at the front vertical faces of said dies for entering an end edge of the tube therebetween, and links connecting the sides of said cutter head and said movable die so that said movable die may be raised after a predetermined movement thereof away from said stationary die.

In testimony whereof we affix our signatures in presence of two witnesses.

PETER PAULSON.
JULIUS M. RICHTER.

Witnesses:
KARL H. BUTLER,
ANNA M. DORR.

Copies of this patent may be obtained for five cents each, by addressing the "Commissioner of Patents, Washington, D. C."